US006890496B2

(12) United States Patent
Singh et al.

(10) Patent No.: US 6,890,496 B2
(45) Date of Patent: May 10, 2005

(54) EXTRACTION OF METALS WITH DIQUATERNARY AMINES

(75) Inventors: Waheguru Pal Singh, College Station, TX (US); Paul Sylvester, Waltham, MA (US)

(73) Assignee: Lynntech, Inc., College Station, TX (US)

( * ) Notice: Subject to any disclaimer, the term of this patent is extended or adjusted under 35 U.S.C. 154(b) by 284 days.

(21) Appl. No.: 10/071,872

(22) Filed: Feb. 7, 2002

(65) Prior Publication Data

US 2003/0157004 A1 Aug. 21, 2003

(51) Int. Cl.$^7$ ............................................. C22B 11/00
(52) U.S. Cl. ............................ 423/22; 423/24; 210/684
(58) Field of Search ........................ 423/22, 24; 75/722; 210/684

(56) References Cited

U.S. PATENT DOCUMENTS

| | | |
|---|---|---|
| 4,041,126 A | 8/1977 | Baltz et al. |
| 4,105,742 A | 8/1978 | Edwards et al. |
| 4,382,067 A | 5/1983 | Grant |
| 4,571,266 A | 2/1986 | Konig et al. |
| 4,726,841 A | 2/1988 | Grant et al. |
| 4,861,564 A | 8/1989 | Rebek |
| 5,165,901 A | 11/1992 | Crozier et al. |
| 5,256,187 A | 10/1993 | Gefvert |
| 5,284,633 A | 2/1994 | Gefvert |
| 5,380,947 A | 1/1995 | Chen et al. |
| 5,478,376 A | 12/1995 | Grant et al. |
| 5,908,814 A | 6/1999 | Patel et al. |
| 6,207,143 B1 | 3/2001 | Lezdey et al. |

FOREIGN PATENT DOCUMENTS

| | | |
|---|---|---|
| ZA | 8006992 | 10/1981 |

OTHER PUBLICATIONS

Translation of CN 1146495, Apr. 2, 1997.*
International Search Report, Application No. PCT/US 03/05444, International Filing Date Feb. 24, 2003, 3 sheets.
Jan G. H. du Preez, Elmaré S. Herselman, Hans E. Rohwer, and Bennie J.A.>M> van Brecht; "Polynitrogen regents in metal separations. Part 2. Diquatemary ammonium cations as precipitants for cobalt (II) and copper ;(II) in hydrochloric acid medium"; South African Jounal of Chemistry, vol 38, No 2, 1985 pp. 49053, XP009016468.
J. G. H. du Preez, D. P. Shillington and B.J.A.M. van Brecht; "Polynitrogen Reagents in Metal Sepration. Part 1. Ditertitary and Diquaternary Ammonium Extractants for Cobalt (II) and Copper (II) in HCI Medium"; Solvent Extraction and Ion Exchange, vol. 2 No. 6, 1984 pp. 839–858, XP009016470.
XP 002253113, Database CA Online, chemical Abstracts Service, Columbus, Ohio, US; Du Preez, Jan Gysbert Hermanus: "Organic diammonium and related compounds as solvent extractants", retrieved from STN data base accession No 97: 42075.

International Search Report, International Application No. PCT/US 03/05444, International Filing Date Feb. 24, 2003, 6 pages.
WPI abstract; AN: 2001–103670 XP–002262954 & CN 1 146 495 (Univ Lamzhou ()CN)); Apr. 2, 1997.
JP 10 008155 A (Nakazawa Hiroyuki (JP)) Jan. 13, 1998 & PAJ abstract.
JP 59 179724 A (Tanaka Kikinzoku Kogyo KK (JP)) Oct. 12, 1984 & PAJ abstract.
JP 58 1714532 A (Tanaka Kikinzoku Kogyo KK (JP)) Oct. 13, 1983 & PAJ abstract.
WPI abstract: AN 1979–002004 XP 002262955 & RO 65 77 6 A (Combinatul Petrochimic (RO)) Dec. 15, 1978.
Vanessa J. Wotring, David M. Johnson, and Leonidas G. Bachas; Polymeric Membrane Anion–Selective Electrodes Based on Diquarternary Ammounium Salts; Anal Chem. 1990, 62, pp. 1506–1510, no month.
J. Letho; "Ion Exchange in the Nuclear Power Industry"; Ion Exchange Process Advances and Applications; pps. 39–53, no date.
M. A. Sadler, "Developments in the Production and Control of Ultrapure Water"; Ion Exchange Process Advances and Applications; pp. 15–28, no date.
Arup K. Sengupta and Tushar Roy; "Ion Exchange Mechanism, Resin Properties and Selective Removal of Hexavalent Chromate"; pp. 194–203, no date.
S. Fredric Marsh; "The Effect of Trimethyl, Triehyl, Tripropyl, and Tributyl Amine Functional Groups in Strong–base Anion Exchange Resin on the Sorption fo Pu(iv) from Nitric Acid", no date.
Piers Grumett, "Precious Metal Recovery fromSpent Catalysts"; Platinium Metals Rev, 2003, 47, (4) pp. 163–166, no month.

* cited by examiner

Primary Examiner—Steven Bos
(74) Attorney, Agent, or Firm—Streets & Steele; Jeffrey L. Streets; Frank J. Campigotto

(57) ABSTRACT

Selective extraction of one or more metal anions from an aqueous solution, by contacting the aqueous solution with an organic solution including a diquaternary amine, wherein the diquaternary amine has two diquaternary nitrogens spaced at a distance of less than about 10 Å, selectively binding the metal anions to the diquaternary amine, and then separating the organic solution from the aqueous solution, wherein the diquaternary amines having the selectively bound metal anions are concentrated in the organic solution. Alternatively, the diquaternary amines may be adsorbed or chemically bonded to a solid, and the metal anion-containing aqueous solution passed over the solid having the diquaternary amines. Palladium may be selectively extracted by contacting the acidic solution with an iodide and an organic solvent, allowing the palladium to bind to the iodide, and then separating the organic solution from the aqueous solution, concentrating the bound palladium ions in the organic solution.

97 Claims, 8 Drawing Sheets

| Compound | D-Value Pd II | Conformation Minimum Energy (kcal/mole) | Connectivity Index (order 2, standard) D | Dipole Moment (debye) E | Electron Affinity (eV) F |
|---|---|---|---|---|---|
| DQ 18 | 2.86 | 39.331 | 11.632 | 12.744 | 7.127 |
| DQ 16 | 1.75 | 39.449 | 11.985 | 2.933 | 6.601 |
| DQ 10 | 1.75 | 40.322 | 12.692 | 0.01 | 5.948 |
| DQ 14 | 2.6 | 39.924 | 11.071 | 25.323 | 8.122 |
| DQ 17 | 3.3 | 50.797 | 17.289 | 25.52 | 7.139 |
| DQ 15 | 0.42 | 49.902 | 17.642 | 0.025 | 6.597 |
| DQ 12 | 1.59 | 50.899 | 18.349 | 0.124 | 5.946 |
| DQ 13 | 3.22 | 50.293 | 16.728 | 52.726 | 8.119 |
| DQ 11 | 0.89 | 49.694 | 16.935 | 0.148 | 7.867 |

FIG. 3A

| Compound | Dielectric Energy (kcal)/mole) G | Steric Energy (kcal/mole) H | Total Energy (Hartree) I | Heat of Formation (kcal/mole) | HOMO Energy (ev) |
|---|---|---|---|---|---|
| DQ 18 | 7.7 | 39.331 | 214.593 | 258.295 | 13.703 |
| DQ 16 | 7.211 | 39.597 | 221.775 | 242.427 | 13.635 |
| DQ 10 | 6.602 | 40.322 | 236.121 | 218.102 | 13.52 |
| DQ 14 | 8.438 | 39.924 | 205.938 | 291.32 | 13.855 |
| DQ 17 | 7.759 | 50.797 | 329.153 | 171.131 | 12.628 |
| DQ 15 | 7.301 | 49.902 | 336.331 | 155.69 | 12.601 |
| DQ 12 | 6.62 | 50.899 | 350.679 | 131.143 | 12.552 |
| DQ 13 | 8.487 | 50.293 | 320.496 | 204.337 | 12.687 |
| DQ 11 | 8.312 | 49.694 | 321.968 | 190.296 | 12.661 |

*FIG. 3B*

| Compound | Ionization Potential (eV) L | Log P M | LUMO (eV) Energy N | Shape Index (basic kappa, order 3) O | Valence Connectivity Index (order 2, standard) Q | Solvent Accessible Surface Area (Å²) P |
|---|---|---|---|---|---|---|
| DQ 18 | 13.703 | 6.409 | -7.127 | 21.031 | 521.24 | 11.069 |
| DQ 16 | 13.635 | 6.86 | -6.601 | 22.027 | 539.815 | 11.423 |
| DQ 10 | 13.52 | 7.653 | -5.948 | 23.967 | 576.054 | 12.13 |
| DQ 14 | 13.855 | 6.179 | -8.122 | 13.04 | 485.397 | 10.53 |
| DQ 17 | 12.628 | 12.75 | -7.139 | 36.681 | 813.7 | 16.726 |
| DQ 15 | 12.601 | 13.201 | -6.598 | 37.686 | 831.853 | 17.08 |
| DQ 12 | 12.552 | 13.993 | 5.946 | 39.658 | 883.721 | 17.787 |
| DQ 13 | 12.687 | 12.52 | -8.119 | 26.747 | 778.615 | 16.187 |
| DQ11 | 12.661 | 12.697 | -7.867 | 35.716 | 793.278 | 16.372 |

FIG. 3C

Predictive Eq. for Pd II $B = 0.0554277*E + 0.610452*L - 16.7616/N - 9.0729$

Predictive Eq. for Pd IV $B = 71.6336*D + 0.463796*E + 23.6272*F + 19.8848*G - 9.37422*H + 2.71931*I + 108.256$ Predictive Eq. for Pt II $B = -276.194*L - 69.6714*M - 4.68162*N - 7.67628*O + 3.7778*P - 154.864*Q + 4211.14$ Predictive Eq. for Pt IV $B = 283.378*D + 1.42399*E + 173.825*F + 212.266*G + 2.69479*H + 144354*I + 167.3$ Predictive Eq. for Rh III $B = 0.00584793*E - 0.90334*N - 42.1486/N - 12.3346$

EXTRACTION OF METALS WITH DIQUATERNARY AMINES

This invention was made with government support under grant DMI-0060201 awarded by the National Science Foundation. The government has certain rights in this invention.

BACKGROUND OF THE INVENTION

1. Field of the Invention

The present invention relates to an extractant and an extraction process. More particularly, the invention relates to an extractant useful for extracting metal ions from an aqueous solution.

2. Description of the Related Art

The platinum group metals (PGMs) are exceedingly rare in nature with average crustal quantities of only a few fractions of a part-per-million (ppm). Only a few large deposits of platinum group metals are known to exist and these deposits are located in South Africa and Russia. Smaller quantities of PGMs are obtained from the anode slimes produced during the electrorefining of nickel and from a few small mineral deposits variously located around the world. The growing demand for platinum group metals and other precious metals in high-technology applications has generated a demand for methods and processes for recycling these materials, especially from spent catalysts and from electronic scrap. It is important that PGMs be recycled because of the limited natural supply of these elements.

PGMs are used as catalysts in the chemical and automotive industry and as oxidation resistant coatings in the electronics sector. Many of these uses, especially the catalytic uses, are ideal for recovering the PGMs because the spent catalyst may be easily processed for metal recovery as part of the disposal process for the spent catalysts. Therefore, there is an interest in improving the methods and processes used for recovering PGMs by making these methods and processes faster and more efficient.

Using traditional smelting techniques to treat materials such as spent catalysts or electronic scrap is not always effective due to the refractory nature and low precious metal content of the spent catalysts and electronic scrap. Leaching spent catalysts and other scrap materials with acidic chloride solutions containing an oxidizing agent is effective in removing the precious metals and has the added advantage of preserving valuable substrates for recycling. However, the recovery and subsequent separation of precious metals, including PGMs, from the chloride feed liquors constitutes a difficult problem because these liquors often contain only low levels of precious metals (ppm levels) but high levels (on the order of grams per liter) of base metals such as iron, copper, zinc, tin, and nickel. Moreover, the volumes of solutions generated from the acid recovery of precious metals from spent catalysts and the like are large compared to the volume of highly concentrated solutions generated from typical precious metal refining. Classical precipitation techniques are inefficient when applied to such solutions and these classical techniques are being replaced by modern separation methods such as solvent extraction processes.

Solvent extraction, sometimes referred to as liquid ion exchange extraction, takes place in two steps. In the first step, the extraction step, a dilute aqueous feed solution containing the metal ion to be recovered is mixed with an immiscible hydrocarbon carrier containing an extractant dissolved therein. When the metal ion contacts the extractant, a metal complex is formed that migrates to the organic phase. In the second step, the stripping step, the "loaded" organic phase, which has been separated from the aqueous feed solution, is mixed with another aqueous solution of a stripping agent (e.g., sulfuric acid) wherein the metal ion passes to the aqueous stripping phase. Therefore, the extraction process converts a dilute feed solution of metal ions into a highly concentrated solution of the precious metal ions from which the metals may be more readily recovered, e.g., by electrolysis. The barren organic phase may then be recycled through the system if desired.

Monoquaternary amines have been somewhat effective in recovering platinum group metals from acidic process streams containing base metals such as nickel and cobalt. Monoquaternary amines contain a positively charged nitrogen atom having four groups bonded to the nitrogen atom, and another atom or substituent that neutralizes the positive charge, typically a hydroxide or a chloride. However, the monoquaternary amines currently used in separation processes are not highly selective, although some selectivity has been achieved by modifying the substituent groups on the quaternized nitrogen atom or by carefully selecting the organic solvent used as a diluent. A monoquaternary amine currently being used in extracting PGMs is N-methyl-N,N-dioctyl-1-octanaminium chloride. (Available as ALIQUAT 336, a registered trademark of the Henkel Corporation of Germany).

In extracting PGMs from an aqueous acidic solution using a monoquaternary amine, the monoquaternary amine is first dissolved in a predominately water-immiscible or organic phase, such as 1-octanol. The aqueous and the organic solutions are then intimately mixed to allow the dissolved quaternary amine salt to form an ion pair with the PGM and transfer the desired PGM species from the aqueous phase into the organic phase. The two phases can then be separated and the extracted anion recovered from the organic phase.

A monoquaternary amine has also been adsorbed onto an inert polymeric support, while still retaining its desirable anion exchange properties, by making a slurry of the quaternary amine in methanol with resin beads and slowly removing the methanol using a rotary evaporator, leaving the monoquaternary amine adsorbed onto the surface of the resin beads. Since the monoquaternary amine is not covalently attached, but only held by weak Van der Waals attractions, the selectivity in extracting PGMs is similar to that of the free monoquaternary amine. In extraction systems, it is preferable for the extractant to be immobilized on a solid support because it eliminates the organic solvent, thereby making processing simpler with fewer environmental concerns.

What is needed is a more selective extractant compound for extracting precious metals, such as PGMs, from acidic solutions. It would be an advantage to provide a method for designing an efficient extraction compound having a high selectivity for a particular precious metal.

SUMMARY OF THE INVENTION

The present invention provides a method for selectively extracting one or more metal anions from an aqueous solution, the method comprising contacting the aqueous solution with an organic solution including a diquaternary amine, wherein the diquaternary amine has two diquaternary nitrogens spaced at a distance of less than about 10 Å, selectively binding the metal anions to the diquaternary amine; and then separating the organic solution from the aqueous solution, wherein the diquaternary amines having the selectively bound metal anions are concentrated in the organic solution.

The method may be used to extract one or more platinum group metals, preferably platinum, palladium, rhodium, and combinations thereof. The diquaternary amines are selective and may selectively extract desired metals from an aqueous solution containing the desired metal anions as well as contaminant metals. The contaminant metals may be, for example, selected from Pb, Al, Ba, Ce, Zr, Fe, Cu, Co, Ni, Mo, Sn, Sb, As, Bi, Zn, Na, K, Ca and combinations thereof. Examples of valuable metals that the diquaternary amines may selectively extract are selected from Ag, Au, Pd, Rh, Pt, Ru, Os, Ir, and combinations thereof. Preferably, the diquaternary amines are used to selectively extract one or more metal anion complex, wherein the distance between the two diquaternary nitrogens allows both diquaternary nitrogens to simultaneously interact with the one or more metal anion complex. In other words, the one or more metal anion complex that has been targeted to be selectively extracted should have a size compatible with forming a complex between both diquaternary nitrogens. It is believed that this simultaneous interaction or complexing occurs when the distance between the two diquaternary nitrogens is within about 5 Angstroms of the size of the complex, either greater or smaller.

The method is not limited to any particular pH of the aqueous solution, but metals are typically dissolved in acidic solutions. These acidic aqueous solutions may contain an acid selected from hydrochloric acid, sulfuric acid, nitric acid, any other acid that may dissolve the metals to be extracted, and combinations thereof. The acid concentration may be of any concentration that dissolves the metal anions to be extracted. The diquaternary amines effectively extract valuable metals at any acid concentration. However, it should be emphasized that an important advantage of the present invention is that any solution that contains dissolved metals to be extracted is suitable for the method of the present invention, whether the solution is a base solution, a neutral solution or an acidic solution.

The aqueous solution is contacted with the organic solution for a time period suitable of less than about 30 minutes, preferably less than about 20 minutes, and more preferably between about 5 minutes and about 20 minutes.

The concentration of the diquaternary amines within the organic solution is any concentration up to saturation, preferably between about 0.5 wt % and about 10 wt %, more preferably between about 0.5 wt % and about 6 wt %, and most preferably between about 1 wt % and about 5 wt %. Preferably there is a molar excess of diquaternary amines in the organic solution over the amount of metal anion to be extracted. The organic solution has an organic solvent able to dissolve the selected one or more diquats and is immiscible with water, preferably selected from chloroform, 1-octanol, methanol, and combinations thereof.

The diquaternary amines are diquaternary ammonium halides that are substantially insoluble in water. The diquaternary amines must provide a distance between the two diquaternary nitrogens that allows the formation of a complex between both diquaternary nitrogens and the one or more metal anion complex to be selectively extracted. This complex between the diquaternary nitrogens and one or more metal anion complex may be formed when the two diquaternary nitrogens are separated by a structure including, without limitation, an alkyl chain that may be either saturated or unsaturated and either straight or branched, or a heterocyclic ring structure that may be either saturated or unsaturated and either substituted or unsubstituted. In the simplest embodiments, the structure that links the two diquaternary nitrogens will having from about 2 to about 8 carbon atoms separating the two diquaternary nitrogens, although additional carbon atoms may be present in sides chains or portions of the ring structure that do not affect the spacing of the nitrogens. It is the spacing of the two diquaternary nitrogens that is most important, and the foregoing structures between the two diquaternary nitrogens should be construed to include all possible hydrocarbon structures. While the halogen may be fluorine, chlorine, bromine or iodine, the halogen is preferably selected from iodine and chlorine.

The method of the present invention is not limited to dissolving the diquaternary amine in an organic solvent. Alternatively, the diquaternary amines may be immobilized on a solid surface, such as a resin or a polymer. In this embodiment, the aqueous solution is mixed or flows over the solid phase having the attached diquaternary amines, wherein the diquaternary amines extract the metal anions from the aqueous solution. The diquaternary amines may be bonded to the solid surface by adsorption or by chemical bonding.

The present invention further provides a method for selectively extracting palladium from an aqueous solution. The method comprises contacting the aqueous solution with an iodide and an organic solvent, allowing the palladium to bind to the iodide, and then separating the organic solution from the aqueous solution, wherein the KI having the bound palladium ions are concentrated in the organic solution.

The present invention further provides a method for first selectively extracting palladium from a mixture of metal anions with an iodide and then selectively extracting other metal anions with the diquaternary amines. The method comprises dissolving the metals into an acidic solution, contacting the acidic solution with an iodide, separating the iodide from the acidic solution, wherein the Pd is bound to the iodide, contacting the acidic solution with an organic solution including a diquaternary amine, wherein the distance between two diquaternary nitrogens is less than about 10 Å, selectively binding the Pt anions to the diquaternary amine, and then separating the organic solution from the aqueous solution, wherein the diquaternary amines having the selectively bound Pt anions are concentrated in the organic solution. The iodide may be either an organic iodide, such as a diquaternary amine iodide, or an inorganic iodide, such as potassium iodide.

The foregoing and other objects, features and advantages of the invention will be apparent from the following more particular description of a preferred embodiment of the invention, as illustrated in the accompanying drawing wherein like reference numbers represent like parts of the invention.

BRIEF DESCRIPTION OF THE DRAWINGS

FIGS. 3A–3C is a table showing the calculated values for different properties of the synthesized diquaternary amines.

DETAILED DESCRIPTION

Figure 1:
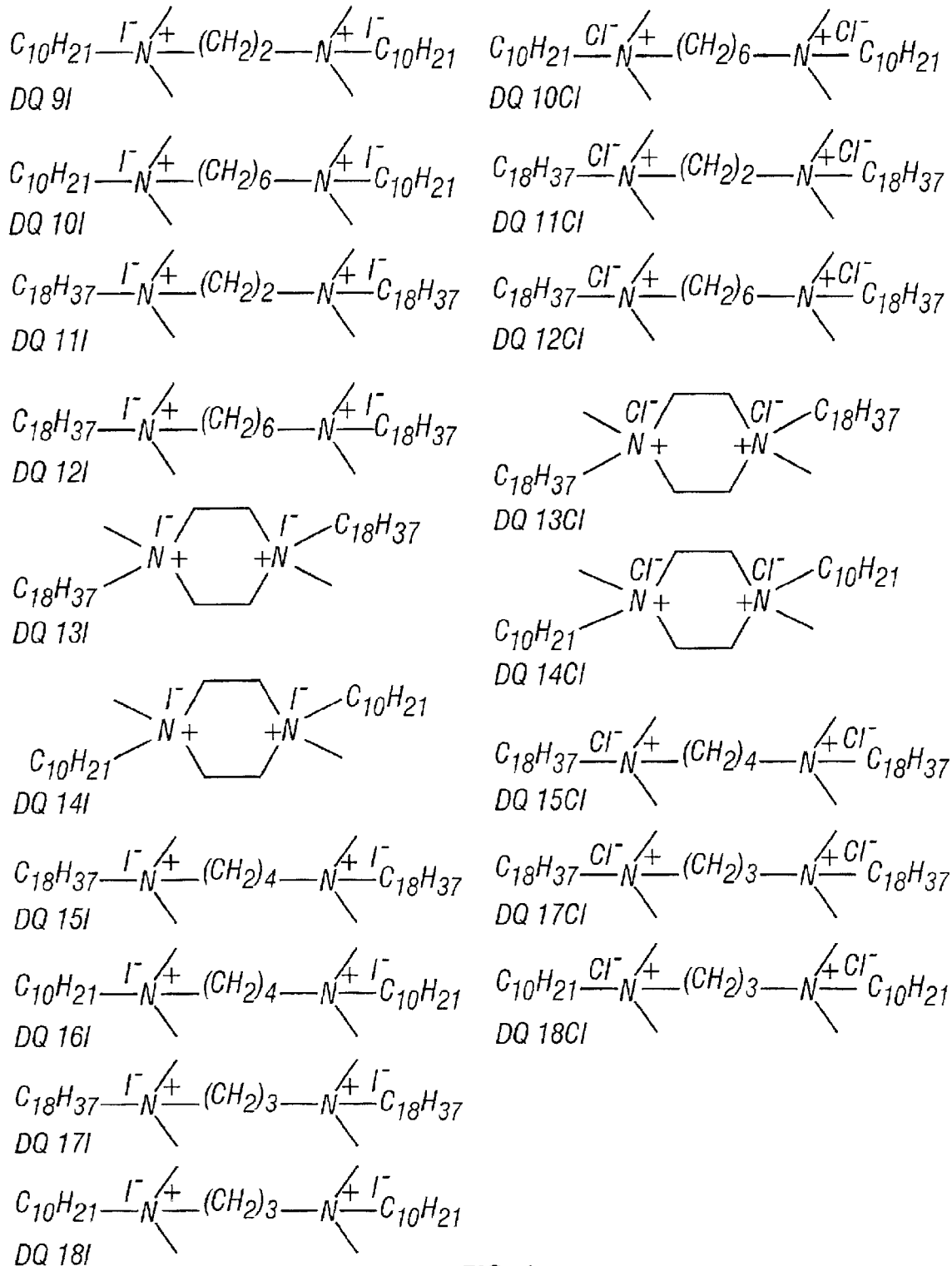
FIG. 1 shows the structures of the diquaternary amines that were synthesized.

The present invention provides a method for using diquaternary amine compounds or extractants to extract anions of platinum group metals and other metals from an aqueous solution. The diquaternary amine compounds have tailor-made properties that enhance their ability to extract platinum group metals and other metals from aqueous solutions. Platinum group metals (PGM) include platinum, palladium, rhodium, iridium, ruthenium and osmium. The interaction between the diquaternary amines of the present invention and the metal anions is specific based upon a favorable spatial arrangement so that the metal anions may be trapped selectively, providing a strong interaction that traps the metal anion as a stable pair.

The strong interaction and the favorable spatial arrangement provided by the diquaternary amines of the present invention are achieved by linking two quaternary amines together with a short aliphatic carbon chain or a small ring, thereby forming a diquaternary amine compound that provides a strong interaction and the favorable spatial arrangement with the target metal anion. Optionally, it should be noted that the chain or the ring may be saturated or unsaturated. By changing the length or size of the chain or ring between the amines, different diquaternary amine compounds may be synthesized having desired spatial arrangements, because the longer the chain or the larger the ring, the farther apart will be the two nitrogens in the resulting diquaternary amine. Therefore, to extract a larger anion, a diquaternary amine may be designed having a longer chain or a larger ring. To extract an anion having a smaller size, a diquaternary amine may be designed having a shorter chain or a reduced ring size. Because the diquaternary amine "grips" the metal complex anion between the two nitrogen atoms, if the anion is significantly smaller than the space between the nitrogens, then the anion will not be selectively extracted because the anion is not large enough to be attracted by both nitrogen atoms at the same time, but only by the lesser attraction of whichever one is closer. Conversely, if the metal anion complex size is much larger than the space between the nitrogens, then the metal anion complex may be less selectively extracted since the anion will not be attracted strongly between the nitrogen atoms. However, because the larger-size anion may still interact with both nitrogen atoms, some selectivity seems to be retained so long as the size of the metal anion complex can still interact with both of the nitrogens of the diquaternary amine. The spatial characteristics of the distance between the two positively charged nitrogen ions thereby leads to a degree of shape and/or size selectivity for specific anions.

The distance between the two quaternary nitrogens does not decrease linearly with the decrease in the number of methylene groups separating them. The distance between two quaternary nitrogens separated by five methylene groups was found to be 7.55 Å decreasing to 3.57 Å with only two methylene groups. The distance was found to be 3.03 Å with a cyclical piperazine derivative. The distance between the nitrogens also changed as a function of the substituent around the nitrogen. In comparison, the average ionic size of the platinum metal halide compounds has been predicted to be about 3 Å.

The diquaternary amines used as extractants in the present invention were synthesized by combining tertiary diamines with a stoichiometric molar excess of alkyl halides to produce diquaternary ammonium halides. The preferred alkyl halides are the alkyl chlorides, such as 1-Chloro octadecane or 1-Chlorodecane, or the alkyl iodides, such as 1-Iodo octadecane or 1-Iododecane. The alkyl halides should be selected to ensure that the diquaternary amines have low water solubility, such as an alkyl halide having ten carbon atoms. If the starting tertiary diamines already have low water solubility, or if the extraction process does not require the diquaternary amine to be dissolved in an organic phase to facilitate separation from the aqueous phase during the extraction process, then other alkyl halides with fewer carbon atoms would be suitable. However, in the examples disclosed herein, water insolubility of the diquaternary amine is ensured by including an alkyl halide with an alkyl group having at least ten carbon atoms.

Exemplary diquaternary ammonium halides may be prepared by the following synthesizing schemes:

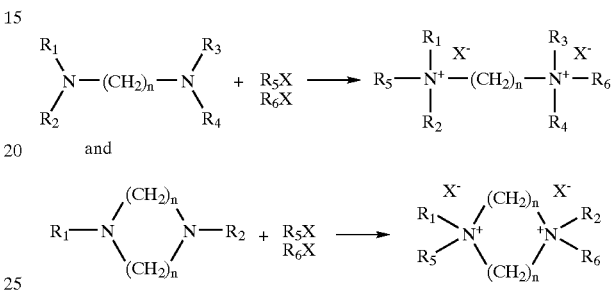

wherein $R_1$–$R_6$ are each independently selected from hydrogen and organic groups, and wherein n is an integer from 2 to about 8. Aromatic diquaternary amines would be similarly synthesized. In accordance with the invention, the chain between the two diquaternary ammoniums may be either saturated or unsaturated and either straight or branched, or the ring between the two diquaternary ammoniums my be either saturated or unsaturated and either substituted or unsubstituted.

The prepared diquaternary amine salts were precipitated as white crystalline solids. Some of the solid diquaternary amines were stored in capped vials in a lab room at room temperature for up to six months. No degradation or decomposition was observed during these six months nor was the extracting ability of the stored diquaternary amines affected when compared with freshly prepared compounds. The diquaternary amines of the present invention therefore appear to be very stable compounds that can be stored for long periods of time without degrading.

The diquaternary amines thus synthesized are useful for extracting platinum group metals and other precious/valuable metals from aqueous solutions, preferably acidic solutions, wherein the metals form an anion complex. The method is not limited only to extracting metals from acidic solutions, but from extracting metal anions from any aqueous solution having any pH. The extraction method comprises contacting the aqueous solution with the diquaternary amines so that the metals may come into contact with the diquaternary amines, wherein a complex is formed between the diquaternary amine and the metal. In effect, the complex allows the diquaternary amine to "capture" or extract the metal from the aqueous solution. After the aqueous solution has contacted the diquaternary amine for a sufficient time, a separation step is required wherein the aqueous solution is separated from the diquaternary amine, leaving the metals with the diquaternary amine. If the diquaternary amine is dissolved in an organic solvent that is not miscible with water, then the separation is achieved by separating the aqueous solution from the immiscible organic solution.

Alternatively, the diquaternary amine may be immobilized on a resin or other surface of an inert substrate or polymer, wherein the separation step involves separating the aqueous solution from a solid phase having a surface on which the diquaternary amines are either adsorbed or chemically bonded. The diquaternary amines may be adsorbed onto the surface as described above for a monoquaternary amine or chemically bonded to a resin bead or similar inert substrate or polymer by including a specially functionalized substituent in the diquaternary amine that can chemically bond to a polymer backbone during polymerization or be chemically attached later on to the inert substrate. For example, in synthesizing the diquaternary amine, the substituent added to the tertiary amines to synthesize the diquaternary amine may include an additional active substituent, such that after the diquaternary amine is synthesized, the active substituent may be brought into contact with a polymer and then bind itself to the polymer under favorable reaction conditions.

When the diquaternary amine is dissolved in an organic solvent to facilitate the separation step of the extraction method, any organic solvent that is immiscible with water would be suitable. A preferred organic solvent is 1-octanol for most of the diquaternary amines. However, to improve the solubility for some of the diquaternary amines in 1-octanol, the addition of chloroform and/or methanol is helpful. A more preferred organic solvent is chloroform because using chloroform as the solvent improves the extraction of the precious metals from the aqueous solution. Table 1 presents a table showing the effect of solvent selection on the extraction of rhodium and platinum using selected diquaternary amines. Organic solutions of the diquaternary amines may have concentrations up to saturation, preferably up to about 10 wt % diquaternary amines. More preferably, the concentrations will range from 0.5 wt % to about 5 wt %. Most preferably, the concentrations will range from about 1 wt % to about 5 wt %.

TABLE 1

| DQ ID | Chloroform | Octanol |
|---|---|---|
| Percent Rh III Removed from a 3M HCl Solution | | |
| 9 I | 88.35 | 63.92 |
| 11 I | 87.48 | 63.40 |
| 17 I | 87.00 | 59.73 |
| Percent Pt III Removed from a 3M HCl Solvent | | |
| 10 Cl | 98.46 | 89.50 |
| 11 Cl | 96.77 | 53.56 |
| 12 Cl | 91.42 | 77.14 |
| 13 Cl | 98.14 | 99.86 |
| 14 Cl | 99.45 | 97.61 |

The required contact time between the diquaternary amine and the aqueous solution during the extraction process is determined by the kinetics of the extraction process. It is desirable to carry out an extraction process in as short a time period as possible to minimize the operating costs. In the method of the present invention, contact time may be less than 30 minutes, preferably less than 20 minutes, and most preferably between about 5 minutes and about 20 minutes.

The metals that may be extracted using this method include platinum group metals and other precious metals. The metals include, for example, platinum, palladium, rhodium, iridium, osmium, ruthenium, gold, silver and combinations thereof. However, the method of the present invention is not limited only to these metal anion complexes but may be used to extract any desired metal anion complex that is attracted to the diquaternary nitrogen atoms and that has an anion complex size similar to the distance between the two diquaternary nitrogen atoms.

Recovering precious metals from spent catalysts, electronic scrap and other similar sources include mixing these precious metal-containing materials with a strong acid, such as sulfuric acid, nitric acid and/or hydrochloric acid to dissolve the metals into an aqueous acidic solution from which the metals may be extracted through an extraction process. While traditionally these metals are dissolved in acidic solutions, the present method is not limited to recovering metal anion complexes only from acidic solutions, but from an aqueous solution having any pH. The resulting acidic solutions containing the precious metals to be extracted will also contain contaminant metals and other materials dissolved by the acid from the spent catalyst and electronic scrap. These contaminant metals often have a higher concentration level in the acidic solution than the desired precious metals, and may include Pb, Al, Ba, Ce, Zr, Fe, Cu, Co, Ni, Mo, Sn, Sb, As, Bi, Zn, Na, K, Ca and combinations thereof.

Figure 2:
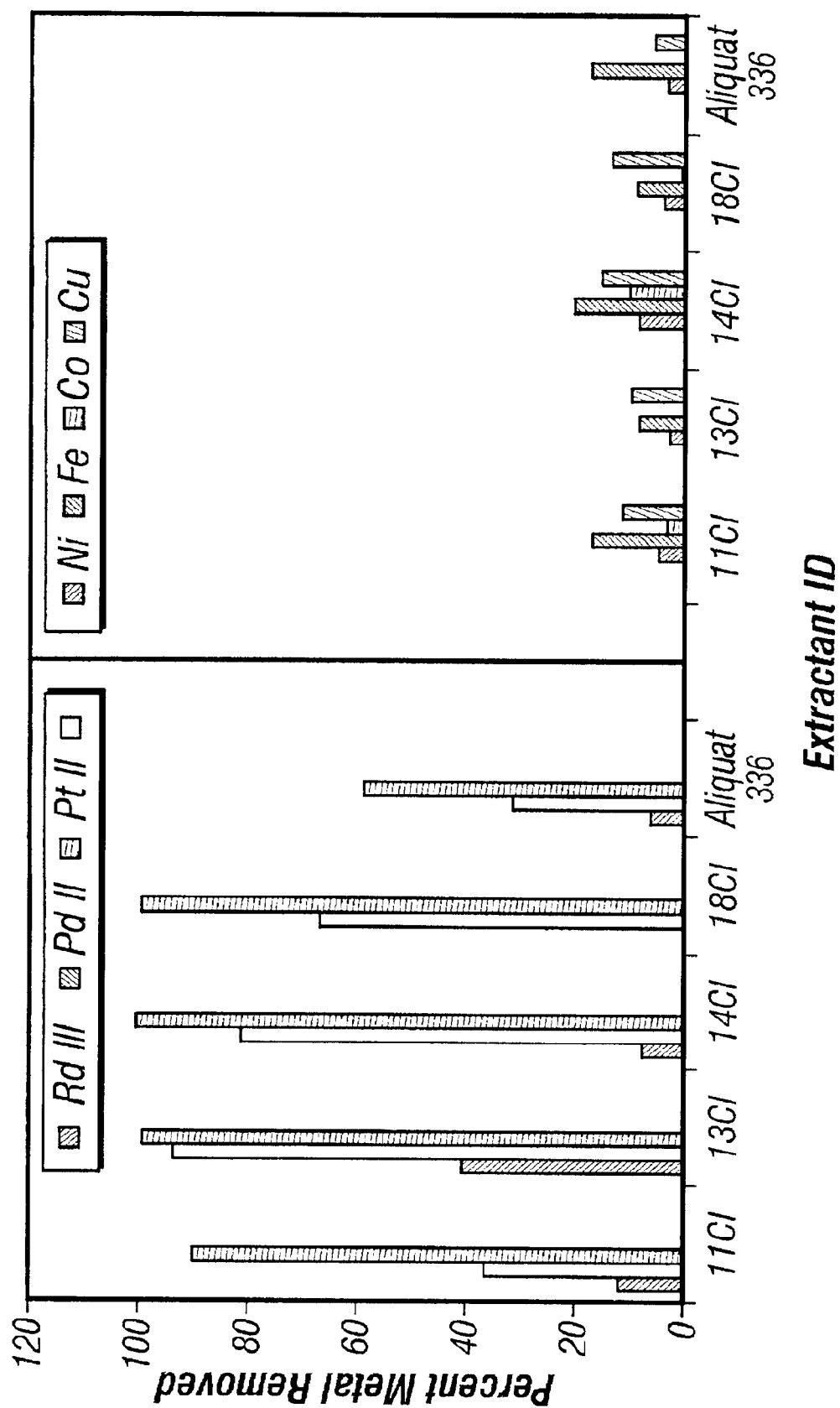
FIG. 2 is a graph showing the percent metal extracted from an aqueous solution containing Rh, Pd, Ni, Fe, Co, and Cu for selected extractants.
Figure 4A:
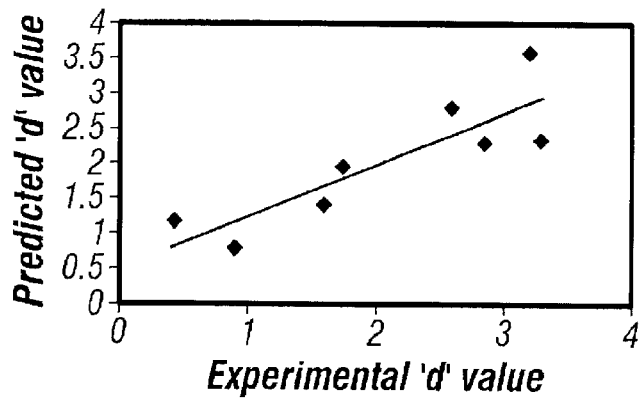
FIGS. 4A–4E are graphs of equations that may be used to predict selectivity of structurally related diquaternary amines for Pd II, Pd IV, Pt II, Pt IV and Rh III.
Figure 4B:
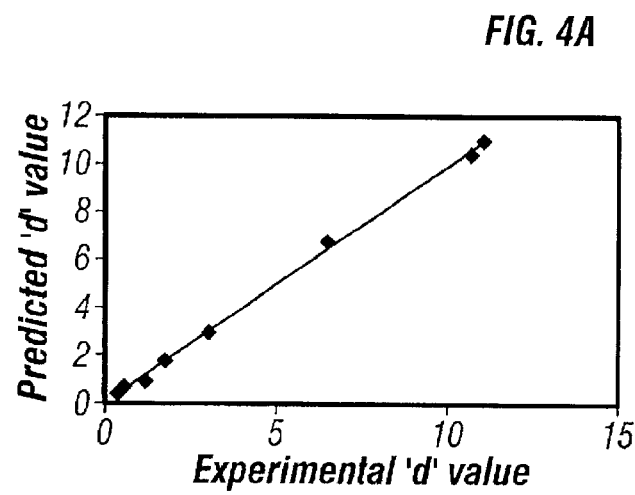
Figure 4C:
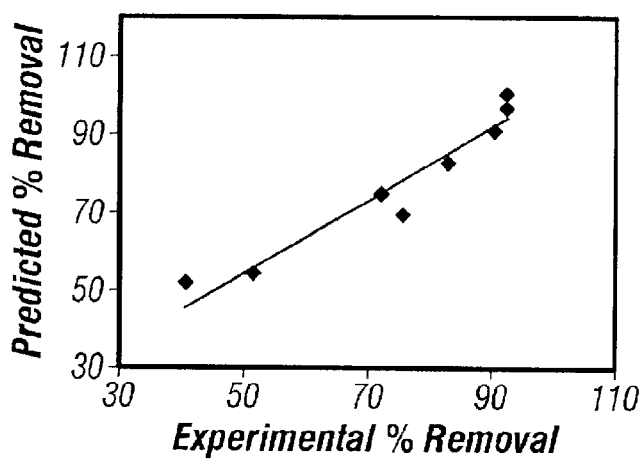
Figure 4D:
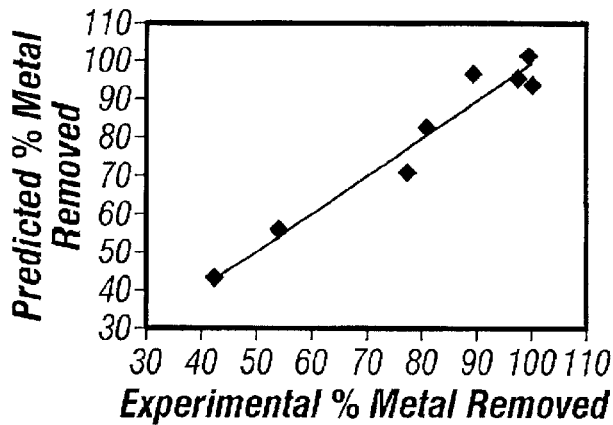
Figure 4E:
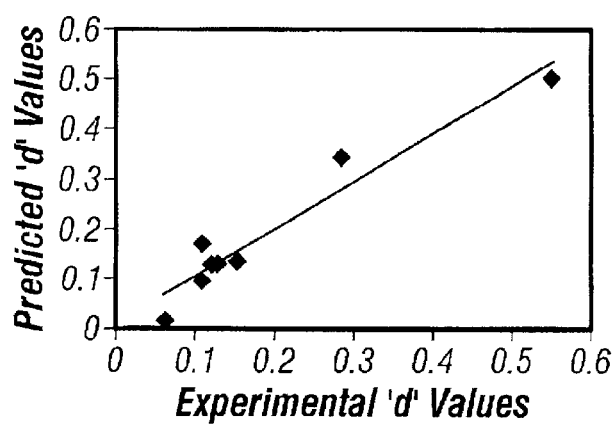

Selected diquaternary amines have shown good selectivity between the contaminant metals and the precious metals when tested in aqueous solutions containing Rh, Pd, Ni, Fe, Co, and Cu. FIG. 2 is a graph showing the percent metal extracted from an aqueous solution containing Rh, Pd, Ni, Fe, Co, and Cu for different selected diquaternary amines of the present invention, as well as the commercially available monoquaternary amine ALIQUAT 336. The metals were extracted from a 3 M hydrochloric acid (HCl) solution containing 50 ppm of each of the metal components using organic solutions having the selected diquaternary amines in concentrations of 2.5 wt %.

The acidity of the aqueous solution may affect the efficacy of the extraction process when using the diquaternary amines. In the case of platinum and rhodium, it has been found that a wide range of acidity is acceptable for the diquaternary amines to extract the metal, with some diquaternary amines performing better than others for a given acidity. A lower acidity is preferred for extracting palladium. Tables 2 through 4 show the effect that the acidity of the aqueous solution has on the ability of selected diquaternary amines to extract platinum, palladium and rhodium. Table 2 shows the effect of differing acid concentrations on the performance of selected diquaternary amines in extracting Pd II and Pd IV from a 50 ppm solution of the metal. Table 3 shows the effect of differing acid concentrations on the performance of selected diquaternary amines in extracting Pt II and Pt IV from a 50 ppm solution of the metal. Table 4 shows the effect of differing acid concentrations on the performance of selected diquaternary amines in extracting Rh III from a 50 ppm solution of the metal.

TABLE 2

| Diquat ID | 0.5M HCl Pd II | 3M HCl Pd II | 10M HCl Pd II | 0.5M HCl Pd IV | 3M HCl Pd IV | 10M HCl Pd IV |
|---|---|---|---|---|---|---|
| 10 Cl | NA | 63.62 | 25.66 | 99.46 | 86.48 | 28.29 |
| 13 Cl | 63.22 | 76.31 | 39.16 | 98.00 | 91.69 | 35.55 |
| 14 Cl | 98.54 | 72.25 | 55.27 | 99.11 | 74.75 | 51.20 |
| 18 Cl | 99.68 | 74.06 | 53.87 | 99.76 | 91.39 | 49.21 |
| Aliquat 336 | 85.22 | 27.25 | 49.93 | 77.87 | 28.52 | 34.27 |

TABLE 3

| Diquat ID | 0.5M HCl Pt II | 3M HCl Pt II | 10M HCl Pt II | 0.5M HCl Pt IV | 3M HCl Pt IV | 10M HCl Pt IV |
|---|---|---|---|---|---|---|
| 10 Cl | 99.82 | 89.50 | 99.82 | 98.91 | 97.45 | 98.91 |
| 13 Cl | 99.80 | 99.86 | 99.80 | 100.00 | 100.00 | 100.00 |
| 14 Cl | 100.00 | 97.61 | 100.00 | 100.00 | 100.00 | 100.00 |
| 18 Cl | 100.00 | 100.00 | 100.00 | 100.00 | 97.65 | 100.00 |
| Aliquat 336 | 96.82 | 46.25 | 96.82 | 86.21 | 63.54 | 86.21 |

TABLE 4

| Diquat ID | 0.5M HCl Rh III | 3M HCl Rh III | 10M HCl Rh III |
|---|---|---|---|
| 11 Cl | 2.85 | 12.99 | 12.28 |
| 13 Cl | 24.54 | 35.61 | 20.04 |
| 14 Cl | 14.70 | 22.05 | 30.84 |
| 18 Cl | 0.0 | 9.64 | 11.50 |
| Aliquat 336 | 2.77 | 0.00 | 0.00 |

Not all diquaternary amines are equally effective in extracting a given precious metal from an aqueous solution. Table 5 illustrates the metal anion selectivity demonstrated by selected diquaternary chloride amines in extracting metal anion complexes from an aqueous solution containing equal concentrations of the extracted metals. As shown in Table 5, the diquaternary amines were most effective in extracting Pt, with Pd being the next most successful metal to be extracted. Rhodium was the least successful to be extracted. However, it should be noted that the diquaternary amines having a distance of 3.03 Å, 3.10 Å, 5.21 Å, and 5.36 Å between the two nitrogens performed best in extracting the metal halide compounds, having an estimated size of about 3 Å. This supports the present conclusion that the performance of the diquaternary amines in extracting metals from an aqueous solution depends on the distance between the nitrogens. Therefore, diquaternary amines may be designed to extract metals from a solution based upon the size of the metal to be extracted.

TABLE 5

| Diquat ID | N Spacing Å | Rh % Extracted | Pt % Extracted | Pd % Extracted |
|---|---|---|---|---|
| 10 Cl | 8.3 | 0 | 86 | 76.62 |
| 11 Cl | 3.68 | 0 | 61.64 | 41.26 |
| 12 Cl | 8.6 | 0 | 53.31 | 53.02 |
| 13 Cl | 3.03 | 21.94 | 100 | 95.67 |
| 14 Cl | 3.10 | 1.95 | 100 | 88.00 |
| 15 Cl | 0.66 | 0 | 38.49 | 26.49 |
| 17 Cl | 5.21 | 1.12 | 92.83 | 56.46 |
| 18 Cl | 5.36 | 0 | 98.63 | 80.71 |
| Aliquat 336 | | 0 | 39.01 | 30.05 |

As may be seen from Table 6, the diquaternary iodides are much better extractants for rhodium than the diquaternary chlorides.

The inventors have also discovered that iodide ions form a complex with the Pd ions in the aqueous acidic solution, rendering the Pd-iodide complex highly soluble in organic solvents. Therefore, Pd may be removed from an acidic aqueous solution simply with the addition of an iodide ion, such as provided by KI dissolved in a solvent such as octanol or chloroform. By adding the iodide, the palladium ions migrate to the organic phase from the aqueous phase, thereby providing an important tool for the separation of Pd from other precious and contaminant metals. The KI may be added to the aqueous solution or to the organic solvent used to recover the palladium, but preferably to the aqueous solution. Other inorganic or organic iodides are acceptable such as NaI, CaI, MgI, monoquaternary amine iododies, alkyl iodides and other organo iodides. The iodide concentration in the solvent is not critical but there should be a molar excess to the metal complex anion. The organic solvent may be any organic solvent that dissolves the metal iodide and is immiscible in water. Contact time should be between less than about 45 minutes, preferably between about 5 minutes and about 30 minutes.

A two step process for selectively extracting precious metals from spent catalyst taken from automobile catalytic converters is beneficial. Platinum and palladium are both used in catalytic converters and may be selectively extracted from an acidic solution containing these metals by using a two step process of the present invention. First, the palladium is removed by contacting the acidic solution with an iodide as described above. After separating the organic solution containing the palladium, the acidic solution is contacted with a second organic solution containing a diquaternary amine that selectively extracts the platinum.

Extracting palladium first by using iodide is beneficial because it allows the diquaternary amines to be used for extracting only the platinum. This provides a separation technique not only for extracting the precious metals from the contaminant metals, but also for obtaining the palladium separate from the platinum.

Quantitative Structure Activity Relationship (QSAR) analysis was used on the synthesized diquaternary amines to determine whether there was a predictive relationship for determining whether a particular diquaternary amine, having a given carbon chain length, would be successful as an extractant for specific precious metal ions. The experimental data obtained for the 10 synthesized diquaternary amines was used to determine a quantitative relationship between the binding abilities of various diquaternary amines and their structural properties. The quantitative relationships derived herein from the limited experimental data available is not meant to be definitive, but demonstrates a method that may be used to design a particular diquaternary amine suitable for selectively extracting a given metal anion complex or group of metal anion complexes.

This quantitative relationship may be used to predict whether a given diquaternary amine would be a good extractant for a particular metal anion. To determine the quantitative relationship, various chemical, physical, topological and electronic descriptors are first calculated using empirical equations based upon the structure of the com-

TABLE 6

| Diquat ID | 9 I | 10 I | 11 I | 12 I | 13 I | 14 I | 15 I | 16 I | 17 I | 18 I | Aliquat 336 |
|---|---|---|---|---|---|---|---|---|---|---|---|
| Rh III % Extracted | 88 | 47 | 87 | 50 | 86 | 71 | 64 | 69.7 | 87 | 57 | 30 | pound. Fifteen different properties were calculated with the results shown in FIGS. 3A–3C.

Next, the experimental values from the solvent extraction experiments were converted into distribution ratios, or D Values. The D Values represent the ratio of the amount of metal ion concentration extracted in the organic phase versus the amount of metal ion concentration remaining in the aqueous phase, as defined by:

$$D=[PGM]_{org}/[PGM]_{aq}$$

Next, these D Values were plotted as experimental D Values on graphs as shown in FIGS. 4A through 4E. Correlations between the calculated properties shown in FIG. 3 and the D Values were determined and analyzed by viewing scatter plots. The properties that gave the best fits were used to generate multiple regression analysis columns. The resulting equations may be used to predict selectivity of structurwere then kept cooled to −15° C. overnight. Precipitates were isolated by vacuum filtration on medium fine filter paper, washed with an additional 20 ml of respective solvent and then vacuum dried overnight. Products were weighed, sealed in glass vials, labeled and stored at 5° C. until further use. Yields of the diquats were nearly quantitative and the overall yields of iodide diquat; were higher than those of the chlorides. Two of the chloride diquats, referred to in FIG. 1 as 9Cl and 16Cl. were unable to be precipitated out using these procedures. The diquaternary amines synthesized by this method are shown in FIG. 1 named in Table 7. The identification numbers used to refer to the diquaternary amines in FIG. 1 was adopted for convenience and has no relevance to the actual structure of the diquats, except that "Cl" refers to the chloride form of the diquat (abbreviated "DQ") and "I" refers to the iodide form of the diquat.

TABLE 7

| DQ9I | Dimethyl, decyl ethylene Diammonium Iodide | DQ9Cl | Dimethyl, decyl ethylene Diammonium Chloride |
|---|---|---|---|
| DQ10I | Dimethyl, decyl hexyl Diammonium Iodide | DQ10Cl | Dimethyl, decyl hexyl Diammonium Chloride |
| DQ11I | Dimethyl, octadecyl ethylene Diammonium Iodide | DQ11Cl | Dimethyl, octadecyl ethylene Diammonium Chloride |
| DQ12I | Dimethyl, octadecyl hexyl Diammonium Iodide | DQ12Cl | Dimethyl, octadecyl hexyl Diammonium Chloride |
| DQ13I | Bis-octadecyl, methyl piperazine Ammonium Iodide | DQ13Cl | Bis-octadecyl, methyl piperazine Ammonium Chloride |
| DQ14I | Bis-decyl, methyl piperazine Ammonium Iodide | DQ14Cl | Bis-decyl, methyl piperazine Ammonium Chloride |
| DQ15I | Dimethyl, octadecyl butyl Diammonium Iodide | DQ15Cl | Dimethyl, octadecyl butyl Diammonium Chloride |
| DQ16I | Dimethyl, decyl butyl Diammonium Iodide | DQ16Cl | Dimethyl, decyl butyl Diammonium Chloride |
| DQ17I | Dimethyl, octadecyl propyl Diammonium Iodide | DQ17Cl | Dimethyl, octadecyl propyl Diammonium Chloride |
| DQ18I | Dimethyl, decyl propyl Diammonium Iodide | DQ18Cl | Dimethyl, decyl propyl Diammonium Chloride | ally related diquaternary amines for future research and applications. FIGS. 4A through 4E further show the prediction equations for Pd II, Pd IV, Pt II, Pt IV and Rh III.

EXAMPLE 1

Ten diquaternary iodide amines and eight diquaternary chloride amines were synthesized in accordance with the present invention. Each of the synthesized diamines was synthesized from one of the following five different diamines: N,N,N,N-Tetramethylethylenediamine (TMED), N,N,N',N'-Tetramethyl-1,4-butanediamine (TMBD), N,N,N',N'-Tetramethyl-1,3-propanediamine (TMPD), N,N,N',N'-Tetramethyl-1,6-hexanediamine (TMHD), or 1-4-Dimethylpiperazine (DMP). To synthesize one of the diquaternary amines, 10 mM (millimoles) of a diamine selected from those listed above, was added to 25 ml of dimethyl formamide in a 200 ml round bottom flask. An alkyl halide was added to this solution at a molar excess of either 4 times or 6 times the stoichiometric requirement. For a stoichiometric molar excess of 4 times, 40 mM of 1-chloro octadecane (COD) or 1-iodo octadecane (IOD) was added. For a stoichiometric molar excess of 6 times, 60 mM of 1-chlorodecane (CD) or 1-iododecane (ID) was added. Then 0.2 g of sodium carbonate was added along with a stir bar.

The flask was then placed in a heated oil bath and magnetically stirred. The oil bath was maintained at 75° C. for the synthesis of iodide diquats and 115° C. for the synthesis of chloride diquats. The flask was capped with a 20° C. water-cooled reflux condenser, sealed with a rubber septum and vented with a syringe needle. The reaction mixture was then sparged with argon, heated, and stirred for 48 hours.

Synthesized iodide diquaternary amines were precipitated by the drop wise addition of the reaction mixtures in 100 ml of benzene while the synthesized chlorides were precipitated in a 50 ml:50 ml mixture of hexanes-benzene. The solutions

EXAMPLE 2

Selected diquaternary amines were used to extract PGMs from solutions of varying acidity to determine the effect of the PGM solution's acid strength on the efficacy of the extraction. Eight solutions were mixed, each containing a selected diquaternary amine dissolved in a mixture of octanol and chloroform at a concentration of 2.5 wt %. Acidic solutions of varying HCL molarity were mixed, each solution containing 50 ppm of one of the following metals: Pd II, Pd IV, Pt II, Pt IV, and Rh III. The HCL acid molarities were 0.5 M HCl, 3 M HCl, and 10 M HCl.

For each of the selected diquaternary amines, the extraction procedure involved contacting 5 ml of the 2.5% diquaternary amine solution with 5 ml of one of the acidic mixtures of the PGMs in a 20 ml glass scintillation vial for 30 minutes with vigorous shaking. Phase separation was aided by centrifuging the mixture at 2500 rpm for three minutes. Using a Pasteur pipet, the aqueous phase was then removed, placed in another scintillation vial, and washed by contacting with 10 ml of chloroform (1 aqueous: 2 organic) for one minute with vigorous shaking. Phase separation was again aided by centrifugation and the aqueous phase was removed, the volume determined, and then analyzed for residual PGM metal concentration determination. Rh and Pd concentrations were determined by Atomic Absorption Spectrometry and Pt concentrations by Inductively Coupled Plasma Atomic Emissions Spectrometry. The concentration of metal extracted by the diquaternary amines into the organic phase was assumed to be the difference between the aqueous phases before and after extraction.

The results, shown as percent of PGMs extracted, are shown in Tables 2–4, supra. As can be seen from Table 2, the selected diquaternary amines were significantly better able to extract Pd II and Pd IV from the 0.5 M HCl solution than from the higher molarity solutions. As shown in Table 3, the selected diquaternary amines were each highly successful in extracting the Pt II and Pt IV from all the varying acid molarity solutions. However, as shown in Table 4, only two of the selected diquaternary amines, 13Cl and 14Cl, were successful in extracting a significant amount of Rh III from all the various acid molarity solutions.

The experiment also analyzed, as shown in each of Tables 2–4, the performance of ALIQUAT 336 in extracting anions at differing acidity. ALIQUAT 336 is a monoquaternary amine that is used commercially to extract metals from an aqueous solution. In every case, the diquaternary amines performed significantly better than ALIQUAT 336. Especially in the case of extracting rhodium, selected diquaternary amines extracted from 22% to 30% of the rhodium present in the aqueous acidic solutions while ALIQUAT 336 only extracted from 0% to 3%. The results of this experiment show that by selecting a particular diquaternary amine as an extractant for a given acidity solution, significantly greater amounts of valuable metals may be extracted from the solutions than using traditional extractants.

EXAMPLE 3

Experiments were conducted using selected diquaternary amines contacted with acidic solutions of PGMs to determine the relative selectivity of selected diquaternary amines towards individual PGMs. An acidic solution containing all three of the PGMs was prepared with the solution containing 50 ppm each of Rh, Pd, and Pt. Using the extraction technique described in Example 2, 2.5% solutions of the selected diquaternary amines, dissolved in either chloroform, 1-octanol or a mixture of the two, were each contacted with the prepared PGM solution. The results are shown in Table 5, supra. The diquaternary amines were shown to be most effective when extracting Pt.

As shown in Table 5, four out of the eight diquaternary amines showed promising performance towards both Pt and Pd metals, but the best performance was obtained with 13Cl and 14Cl. This fits with the theory that the performance of the diquaternary amines depends upon the number of methylenes, and hence the distance, between the two quaternary nitrogens. As shown in Table 5, for diquaternary amines 13Cl and 14Cl, the distance between the quaternary nitrogens is about 3 Å. It should be noted that the average ionic size of the metal halide compounds has been calculated to be approximately 3 Å, thereby verifying that the diquaternary nitrogen spacing is responsible for causing 13Cl and 14Cl to be the best performers.

Again, as in the last example, ALIQUAT 336 was included as an extractant for analysis and comparison between the performance of ALIQUAT 336, the monoquaternary amine currently used to extract metals, and the diquaternary amines used as described in the present invention. As may be seen in Table 5, selected diquaternary amines extracted significantly more rhodium, platinum and palladium than the ALIQUAT 336 was able to extract.

EXAMPLE 4

A catalytic converter from a car made in the United States was obtained from a junkyard. The converter was opened with a chop saw and two monoliths were removed. The back monolith was chopped into pieces and about 203 g of this material was contacted with 375 ml of concentrated HCL in a two-liter beaker. About 500 ml of water was added to cover the material completely and then heated to 50° C. for one hour. The solution was allowed to stand overnight, and then filtered to remove the particulates.

Figure 5:
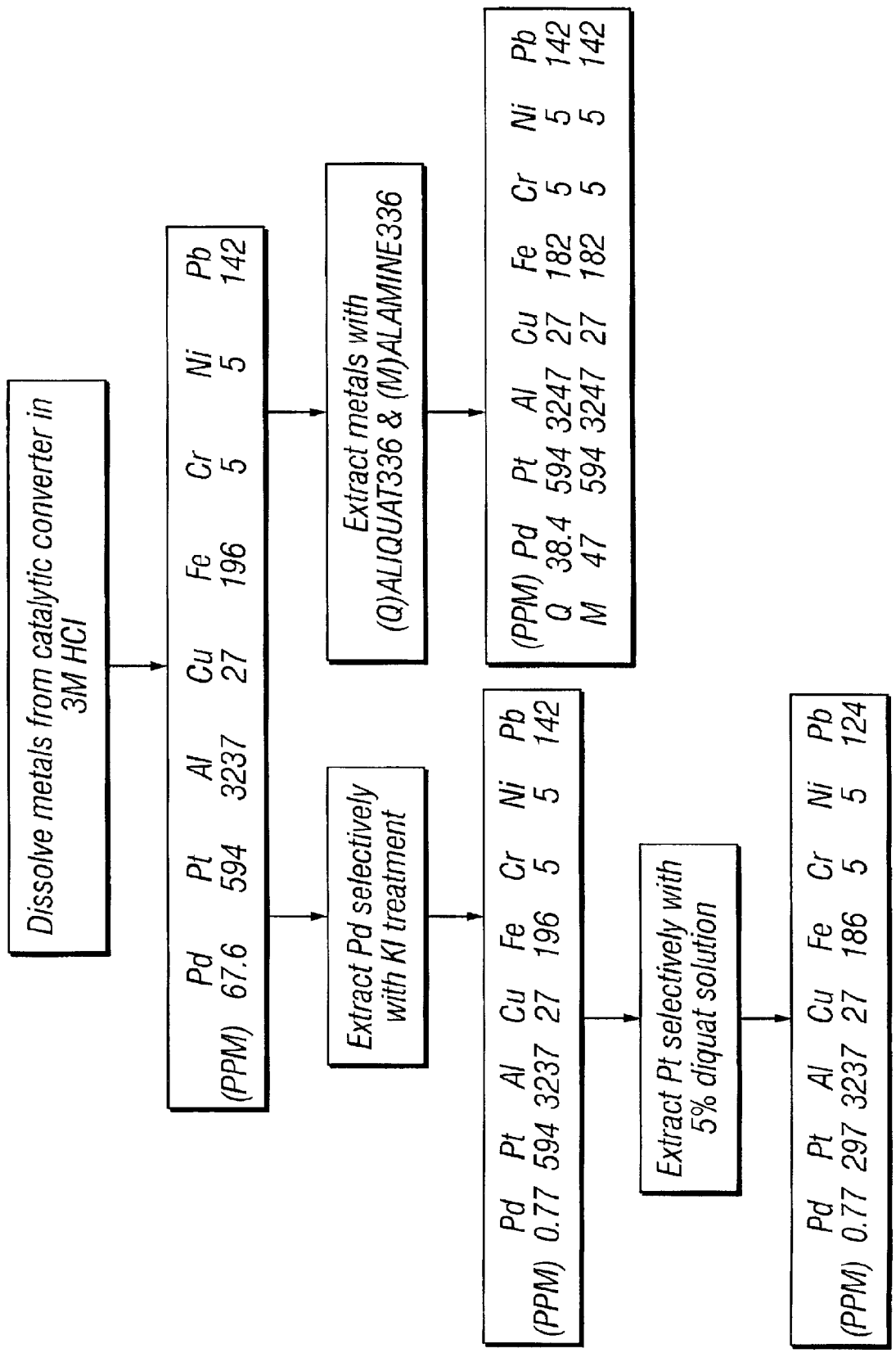
FIG. 5 is a chart showing the metal concentrations at different stages of a metal recovery experiment using an embodiment of the metal recovery method of the present invention.

The solution was analyzed to determine the concentrations of the metal ions present in the solution. The initial concentration of each of the metals is shown in FIG. 5. The acid molarity of the solution was estimated to be 3 M.

To remove the Pd from the solution, 120 ml of a solution made up of octanol and 0.024 g KI, was contacted with the acid solution for 30 minutes. After phase separation, four 10 ml portions were formed from the aqueous phase, the remainder being submitted for analysis. Each portion was separately contacted, by the extraction technique described in Example 2, with 10 ml of three different extractants: a 5% solution of the 13Cl diquaternary amine, a solution of ALIQUAT 336 and a solution of ALAMINE 336. (ALIQUAT 336 and ALAMINE 336 are both registered trademarks of the Henkel Corporation of Germany). After phase separation, the aqueous phases were removed and submitted for Pt and Pd analysis. The organic phases were treated with sodium borohydride to recover the extracted metals. The results are shown in FIG. 5.

As can be seen in FIG. 5, the addition of the KI resulted in the removal of 98% of the Pd from the solution. In the next step, extraction with a 5% diquaternary amine in solution with octanol/chloroform selectively removed about 50% of the Pt from the solution. The other contaminant metals present in the solution, in large excess over the PGMs, were mostly unchanged. By comparison, the commercial products traditionally used to extract metals from acidic solutions were only able to extract a small quantity of the Pd from the solution, while Pt was not extracted at all.

It should be noted that the commercial product did not extract any platinum in this example, while in the other examples the commercial product did extract platinum. The commercial product is not as selective as the diquaternary amines used in the present invention. Therefore, with a large mixture of metals in the metal solution, the commercial product selects metals other than the most desirable. By contrast, the diquaternary amines are quite selective and selectively extracted the desired valuable metals.

It is apparent that selectively extracting palladium first by using an iodide is beneficial because it allows the diquaternary amines to be used for extracting only the other preferred metals. Extracting capacity by the diquaternary amines is not reduced by having to extract palladium. Furthermore, it becomes apparent that selected diquaternary amines may be used in separate extracting processes after the palladium has been extracted, each additional extracting process selectively extracting one or more valuable metals from the aqueous solution. For example, after the palladium has been extracted using an iodide, platinum may be extracted using one diquaternary amine selective for platinum, and then after separation, rhodium may be extracted using a different diquaternary amine selective for rhodium.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A method for selectively extracting one or more metal anion complexes from an aqueous solution, the method comprising:

contacting the aqueous solution with an organic solution including a diquaternary amine, wherein the diquaternary amine has two diquaternary nitrogens spaced at a distance of less than about 10 Å, wherein the aqueous solution comprises anion complexes of one or more target metals and anion complexes of one or more other metals;

selectively binding the one or more target metal anion complexes to the diquaternary amine; and then separating the organic solution from the aqueous solution, wherein the diquaternary amine having the selectively bound target metal anion complexes are concentrated in the organic solution.

2. The method of claim 1, wherein the one or more target metal anion complexes comprise one or more platinum group metals.

3. The method of claim 1, wherein the one or more target metal anion complexes are selected from anions of Pt, Pd, Rh, and combinations thereof.

4. The method of claim 1, wherein the diquaternary amine has an alkyl group having at least 10 carbon atoms.

5. The method of claim 1, wherein the other metals are selected from the group consisting of Pb, Al, Ba, Ce, Zr, Fe, Cu, Co, Ni, Mo, Sn, Sb, As, Bi, Zn, Na, K, Ca and combinations thereof.

6. The method of claim 1, wherein the one or more target metal anion complexes comprise a metal selected from Ag, Au, Pd, Rh, Pt, Ru, Os, Ir, and combinations thereof.

7. The method of claim 1, wherein the distance between the two diquaternary nitrogens is between about 5 Å loss and 5 Å more than the size of the one or more target metal anion complexes to be selectively extracted.

8. The method of claim 1, wherein the distance between the two diquaternary nitrogens allows the formation of a complex between both diquaternary nitrogens and the one or more target metal anion complexes to be selectively extracted.

9. The method of claim 1, wherein the aqueous solution is acidic.

10. The method of claim 1, wherein the aqueous solution contains an acid selected from hydrochloric acid, sulfuric acid, nitric acid and combinations thereof.

11. The method of claim 9, wherein the diquaternary amine extracts the one or more target metal anion complexes at all acid concentrations.

12. The method of claim 1, wherein the aqueous solution is contacted with the organic solution for a time period of less than about 30 minutes.

13. The method of claim 1, wherein the aqueous solution is contacted with the organic solution for a time period of less than about 20 minutes.

14. The method of claim 1, wherein the aqueous solution is contacted with the organic solution for a time period of between about 5 minutes and about 20 minutes.

15. The method of claim 1, wherein the concentration of the diquaternary amine within the organic solution is between about 10% and saturation.

16. The method of claim 1, wherein the concentration of the diquaternary amine within the organic solution is between about 0.5% and about 10%.

17. The method of claim 1, wherein the concentration of the diquaternary amine within the organic solution is between about 0.5% and about 6%.

18. The method of claim 1, wherein the concentration of the diquaternary amine within the organic solution is between about 1% and about 5%.

19. The method of claim 1, wherein the organic solution has an organic solvent selected from chloroform, 1-octanol, methanol, and combinations thereof.

20. The method of claim 1, wherein the organic solution has any of one or more water immiscible organic solvents in which the diquaternary amine is soluble.

21. The method of claim 1, wherein the diquaternary amine is a diquaternary ammonium halide that is essentially insoluble in water.

22. The method of claim 1, wherein the two diquaternary nitrogens are separated by an alkyl chain.

23. The method of claim 22, wherein the alkyl chain is saturated.

24. The method of claim 22, wherein the alkyl chain is unsaturated.

25. The method of claim 22, Wherein the alkyl chain is straight.

26. The method of claim 22, wherein the alkyl chain is branched.

27. The method of claim 1, wherein the two diquaternary nitrogens are linked in a heterocyclic ring structure.

28. The method of claim 27, wherein the ring structure is saturated.

29. The method of claim 27, wherein the ring structure is unsaturated.

30. The method of claim 27, wherein the ring structure is straight.

31. The method of claim 27, wherein the ring structure is branched.

32. The method of claim 21, wherein the diquaternary ammonium halide comprises a halogen selected from iodine and chlorine.

33. The method of claim 21, wherein the diquaternary ammonium halide comprises a halogen selected from bromine and fluorine.

34. The method of claim 1, wherein the one or more target metal anion complexes comprises a metal selected from Pd, Pt, Rh and combinations thereof, and wherein the two diquaternary nitrogens are separated by an alkyl chain having 2 to 8 carbon atoms.

35. The method of claim 1. wherein the one or more target metal anion complexes comprises a metal selected from Pd, Pt, Rh and combinations thereof, and wherein the two diquaternary nitrogens are separated by an alkyl chain having 2 to 6 carbon atoms.

36. The method of claim 1, wherein the one or more target metal anion complexes comprises a metal selected from Pd, Pt, Rh and combinations thereof, and wherein the two diquaternary nitrogens are separated by an alkyl chain having 2 to 3 carbon atoms.

37. The method of claim 21, wherein the diquaternary ammonium halide is a chloride.

38. The method of claim 21, wherein the diquaternary ammonium halide is an iodide.

39. The method of claim 1, wherein the one or more target metal anion complexes comprises a metal selected from Pd, Pt, Rh and combinations thereof, and wherein the two diquaternary nitrogens are part of a heterocyclic ring structure having 2 to 8 carbon atoms.

40. The method of claim 21, wherein the diquaternary ammonium halide is selected from a chloride, an iodide, and combinations thereof.

41. The method of claim 27, wherein the heterocyclic ring structure is a cyclic piperazine derivative.

42. The method of claim 1, wherein the diquaternary amine has at least one side chain having more than 12 carbon atoms.

43. The method of claim 1, wherein the diquaternary amine has at least one side chain having less than 7 carbon atoms.

44. The method of claim 1, wherein the one or more metal anion complexes comprise one or more precious metals.

45. The method of claim 1, wherein the diquaternary amine is prepared by the reaction between a tertiary diamine and alkyl halide.

46. The method of claim 1, wherein the diquaternary amine is prepared from a diamine selected from tetramethylethylenediamine, tetramethylbutanediamine, tetramethyl propanediamine, tetramethyl hexanediamine and dimethylpiperazine.

47. The method of claim 1, wherein the diquaternary amine is bis-octadecyl, methyl piperazine ammonium chloride.

48. The method of claim 1, wherein the diquaternary amine is bis-decyl, methyl-piperazine ammonium chloride.

49. The method of claim 1, wherein the diquaternary amine is dim ethyl, octadecyl ethylene diammonium chloride.

50. The method of claim 1, wherein the diquaternary amine is dimethyl, decyl ethylene diammonium chloride.

51. The method of claim 1, wherein the diquaternary amine is dimethyl, octadecyl propyl diammonium chloride.

52. The method of claim 1, wherein the diquaternary amine is dimethyl, decyl propyl diammonium chloride.

53. The method of claim 1, wherein the diquaternary amine is dimethyl, octadecyl butyl diammonium chloride.

54. The method of claim 1, wherein the diquaternary amine is dimethyl, decyl butyl diammonium chloride.

55. The method of claim 1, wherein the diquaternary amine is dimethyl, octadecyl hexyl diammonium chloride.

56. The method of claim 1, wherein the diquaternary amine is dimethyl, decyl hexyl diammonium chloride.

57. The method of claim 1, wherein the diquaternary amine is bis-hydroxyethyl, octadecyl piperazine ammonium chloride.

58. The method of claim 1, wherein the diquaternary amine is diethyl, octadecyl propyl diammonium chloride.

59. The method of claim 1, wherein the diquaternary amine is bis-hydroxyethyl, eicosyl piperazine ammonium bromide.

60. The method of claim 1, wherein the diquaternary amine is diethyl, eicosyl propyl diammonium bromide.

61. The method of claim 1, wherein the diquaternary amine is bis-hydroxyethyl, docosyl piperazine ammonium bromide.

62. The method of claim 1, wherein the diquaternary amino is diethyl, docosyl piperazine diammonium bromide.

63. The method of claim 2, wherein the diquaternary amine is bis-octadecyl, methyl piperazine ammonium chloride.

64. The method of claim 2, wherein the diquaternary amine is bis-decyl, methyl-piperazine ammonium chloride.

65. The method of claim 2, wherein the diquaternary amine is dimethyl, octadecyl ethylene diammonium chloride.

66. The method of claim 2, wherein the diquaternary amine is dimethyl, decyl ethylene diammonium chloride.

67. The method of claim 2, wherein the diquaternary amine is dimethyl, octadecyl propyl diammonium chloride.

68. The method of claim 2, wherein the diquaternary amine is dimethyl, decyl propyl diammonium chloride.

69. The method of claim 2, wherein the diquaternary amine is dimethyl, octadecyl butyl diammonium chloride.

70. The method of claim 2, wherein the diquaternary amine is dimethyl, decyl butyl diammonium chloride.

71. The method of claim 2, wherein the diquaternary amine is dimethyl, octadecyl hexyl diammonium chloride.

72. The method of claim 2. wherein the diquaternary amino is dimethyl, decyl hexyl diammonium chloride.

73. The method of claim 2, wherein the diquaternary amine is bis-hydroxyethyl, octadecyl piperazine ammonium chloride.

74. The method of claim 2, wherein the diquaternary amine is diethyl, octadecyl propyl diammonium chloride.

75. The method of claim 2, wherein the diquaternary amine is bis-hydroxyethyl, eicosyl piperazine ammonium bromide.

76. The method of claim 2, wherein the diquaternary amine is diethyl, eicosyl propyl diammonium bromide.

77. The method of claim 2, wherein the diquaternary amine is bis-hydroxyethyl, docosyl piperazine ammonium bromide.

78. The method of claim 2, wherein the diquaternary amine is diethyl, docosyl piperazine diammonium bromide.

79. The method of claim 6, wherein the diquaternary amine is selected from bis-octadecyl methyl piperazine ammonium chloride, bis-decyl methyl-piperazine ammonium chloride, dimethyl octadecyl ethylene diammonium chloride, dimethyl decyl ethylene diammonium chloride, dimethyl octadecyl propyl diammonium chloride, dimethyl decyl propyl diammonium chloride, dimethyl octadecyl butyl diammonium chloride, dimethyl decyl butyl diammonium chloride, dimethyl octadecyl hexyl diammonium chloride, dimethyl decyl hexyl diammonium chloride, bis-hydroxyethyl octadecyl piperazine ammonium chloride, diethyl octadecyl propyl diammonium chloride, bis-hydroxyethyl eicosyl piperazine ammonium bromide, diethyl eicosyl propyl diammonium bromide, bis-hydroxyethyl docosyl piperazine ammonium bromide, and diethyl docosyl piperazine diammonium bromide.

80. A method for recovering Pd and Pt metals from a spent catalyst comprising:
dissolving the Pd and Pt into an acidic solution to form Pd and Pt anion complexes;
contacting the acidic solution with an iodide;
separating the iodide from the acidic solution, wherein the Pd anion complexes are bound to the iodide;
contacting the acidic solution with an organic solution including a diquaternary amine, wherein the distance between two diquaternary nitrogens is less than about 10 Å;
selectively binding the Pt anion complex to the diquaternary amine; and
separating the organic solution from the aqueous solution, wherein the diquaternary amines having the bound Pt anion complex are concentrated in the organic solution.

81. The method of claim 80, wherein the acidic solution contains acids selected from hydrochloric acid, sulfuric acid, nitric acid and combinations thereof.

82. The method of claim 80, wherein the iodide is selected from potassium iodide, sodium iodide, magnesium iodide, calcium iodide and combinations thereof.

83. The method of claim 80, wherein the iodide is an organic iodide.

84. The method of claim 80, wherein the iodide is an inorganic iodide.

85. The method of claim 80, wherein the diquaternary amine is selected from bis-octadecyl methyl piperazine ammonium chloride, bis-decyl methyl-piperazine ammonium chloride, dimethyl octadecyl ethylene diammonium chloride, dimethyl decyl ethylene diammonium chloride, dimethyl octadecyl propyl diammonium chloride, dimethyl decyl propyl diammonium chloride, dimethyl octadecyl butyl diammonium chloride, dimethyl decyl butyl diammonium chloride, dimethyl octadecyl hexyl diammonium chloride, dimethyl decyl hexyl diammonium chloride, bis-hydroxyethyl octadecyl piperazine ammonium chloride, diethyl octadecyl propyl diammonium chloride, bis-hydroxyethyl eicosyl piperazine ammonium bromide, diethyl eicosyl propyl diammonium bromide, bis-hydroxyethyl docosyl piperazine ammonium bromide, and diethyl docosyl piperazine diammonium bromide.

86. A method for recovering palladium from an aqueous solution, comprising:
   contacting a material containing palladium and at least one other platinum group metal with an acid;
   dissolving the palladium and the other platinum group metal into the acidic aqueous solution;
   contacting the aqueous solution with an iodide and an organic solvent, wherein the iodide is selected from potassium iodide, sodium iodide, magnesium iodide, calcium iodide and combinations thereof;
   selectively binding the palladium to the iodide; and then
   separating the organic solution from the aqueous solution, wherein the iodide having the bound palladium ions are concentrated in the organic solution.

87. A method for selectively extracting one or more metal anion complexes from an aqueous solution, the method comprising:
   contacting the aqueous solution with a diquaternary amine, wherein the distance between two diquaternary nitrogens is less than about 10 Å;
   binding the one or more metal anion complexes to the diquaternary amine; and then
   separating the diquaternary amine from the aqueous solution, wherein the diquaternary amine is bound to a solid surface of an inert substrate.

88. The method of claim 87, wherein the one or more metal anion complexes comprises one or more platinum group metals.

89. The method of claim 87, wherein the diquaternary amine is bound to a solid surface by means selected from adsorption and chemical bonding.

90. The method of claim 87, wherein the inert substrate is a polymer.

91. The method of claim 87, wherein the diquaternary amine is selected from bis-octadecyl methyl piperazine ammonium chloride, bis-decyl methyl-piperazine ammonium chloride, dimethyl octadecyl ethylene diammonium chloride, dimethyl decyl ethylene diammonium chloride, dimethyl octadecyl propyl diammonium chloride, dimethyl decyl propyl diammonium chloride, dimethyl octadecyl butyl diammonium chloride, dimethyl decyl butyl diammonium chloride, dimethyl octadecyl hexyl diammonium chloride, dimethyl decyl hexyl diammonium chloride, bis-hydroxyethyl octadecyl piperazine ammonium chloride, diethyl octadecyl propyl diammonium chloride, bis-hydroxyethyl eicosyl piperazine ammonium bromide, diethyl eicosyl propyl diammonium bromide, bis-hydroxyethyl docosyl piperazine ammonium bromide, and diethyl docosyl piperazine diammonium bromide.

92. The method of claim 88, wherein the diquaternary amine is selected from bis-octadecyl methyl piperazine ammonium chloride, bis-decyl methyl-piperazine ammonium chloride, dimethyl octadecyl ethylene diammonium chloride, dimethyl decyl ethylene diammonium chloride, dimethyl octadecyl propyl diammonium chloride, dimethyl decyl propyl diammonium chloride, dimethyl octadecyl butyl diammonium chloride, dimethyl decyl butyl diammonium chloride, dimethyl octadecyl hexyl diammonium chloride, dimethyl decyl hexyl diammonium chloride, bis-hydroxyethyl octadecyl piperazine ammonium chloride, diethyl octadecyl propyl diammonium chloride, bis-hydroxyethyl eicosyl piperazine ammonium bromide, diethyl eicosyl propyl diammonium bromide, bis-hydroxyethyl docosyl piperazine ammonium bromide, and diethyl docosyl piperazine diammonium bromide.

93. A method for recovering valuable metals comprising:
   a. dissolving metals into an aqueous acidic solution to form anions of the metals, wherein the metals comprise Pd, a second valuable metal, and a third valuable metal;
   b. contacting the acidic solution with an iodide;
   c. separating the iodide from the acidic solution, wherein the anions of Pd are bound to the iodide,
   d. contacting the acidic solution with a first organic solution including a first diquaternary amine, wherein the distance between two diquaternary nitrogens in the first diquaternary amine is less than about 10 Å and wherein the first diquaternary amine is a selective extractant for the anions of the second valuable metal;
   e. selectively binding the second valuable metal anions to the first diquaternary amine; and then
   f. separating the organic solution from the aqueous acidic solution, wherein the first diquaternary amine has the selectively bound second valuable metal anions concentrated in the organic solution.
   g. repeating d through f, using a second diquaternary amine to selectively extract the anions of the third valuable metal.

94. The method of claim 93, wherein the iodide is selected from potassium iodide, sodium iodide, magnesium iodide, calcium iodide and combinations thereof.

95. The method of claim 93, wherein the iodide is an organic iodide.

96. The method of claim 93, wherein the iodide is an inorganic iodide.

97. The method of claim 93, wherein the first and second diquaternary amine are independently selected from bis-octadecyl methyl piperazine ammonium chloride, bis-decyl methyl-piperazine ammonium chloride, dimethyl octadecyl ethylene diammonium chloride, dimethyl decyl ethylene diammonium chloride, dimethyl octadecyl propyl diammonium chloride, dimethyl decyl propyl diammonium chloride, dimethyl octadecyl butyl diammonium chloride, dimethyl decyl butyl diammonium chloride, dimethyl octadecyl hexyl diammonium chloride, dimethyl decyl hexyl diammonium chloride, bis-hydroxyethyl octadecyl piperazine ammonium chloride, diethyl octadecyl propyl diammonium chloride, bis-hydroxyethyl eicosyl piperazine ammonium bromide, diethyl eicosyl propyl diammonium bromide, bis-hydroxyethyl docosyl piperazine ammonium bromide, and diethyl docosyl piperazine diammonium bromide.

* * * * *